United States Patent
Hickey et al.

(10) Patent No.: US 11,335,924 B2
(45) Date of Patent: May 17, 2022

(54) INTEGRATED FUEL CELL SYSTEMS

(71) Applicant: CUMMINS ENTERPRISE LLC, Indianapolis, IN (US)

(72) Inventors: Darren Bawden Hickey, Halfmoon, NY (US); Irfan Hussaini, Glenville, NY (US)

(73) Assignee: Cummins Enterprise LLC, Indianapolis, IN (US)

( * ) Notice: Subject to any disclaimer, the term of this patent is extended or adjusted under 35 U.S.C. 154(b) by 258 days.

(21) Appl. No.: 16/505,170

(22) Filed: Jul. 8, 2019

(65) Prior Publication Data
US 2020/0020963 A1  Jan. 16, 2020

Related U.S. Application Data

(62) Division of application No. 15/263,505, filed on Sep. 13, 2016, now Pat. No. 10,347,924.

(51) Int. Cl.
*H01M 8/00* (2016.01)
*H01M 8/04089* (2016.01)
(Continued)

(52) U.S. Cl.
CPC ... *H01M 8/04097* (2013.01); *H01M 8/04014* (2013.01); *H01M 8/04022* (2013.01); *H01M 8/04201* (2013.01); *H01M 8/04708* (2013.01); *H01M 8/2425* (2013.01); *H01M 8/2475* (2013.01); *H01M 8/2484* (2016.02)

(58) Field of Classification Search
CPC ............. H01M 8/2484; H01M 8/2475; H01M 8/04022; H01M 8/04708; H01M 8/2425; H01M 8/04097
See application file for complete search history.

(56) References Cited

U.S. PATENT DOCUMENTS

| 5,340,664 A | 8/1994 | Hartvigsen |
| 6,670,062 B2 | 12/2003 | Rush |

(Continued)

FOREIGN PATENT DOCUMENTS

| JP | 2001-052727 A | 2/2001 |
| JP | 2004-103282 A | 4/2004 |

(Continued)

OTHER PUBLICATIONS

Hoseinpoori et al., "Optimal Design of Gas Turbine-Solid Oxide Fuel Cell Hybrid Plant", Electrical Power and Energy Conference, pp. 29-34, Oct. 3-5, 2011.

(Continued)

*Primary Examiner* — Cynthia H Kelly
*Assistant Examiner* — Monique M Wills
(74) *Attorney, Agent, or Firm* — Barnes & Thornburg LLP

(57) ABSTRACT

An integrated fuel cell system includes fuel cells, fuel heat exchangers, air heat exchangers, and tail gas oxidizers. The tail gas oxidizers oxidize a (second) portion of fuel received from the fuel cells with effluent that is output from the fuel cells. Fuel cell stacks are fluidly coupled with the fuel heat exchangers and the tail gas oxidizers such that the fuel that is output from the fuel cells is split into a first portion that is directed back into the fuel heat exchangers and a second portion that is directed into the tail gas oxidizers.

16 Claims, 3 Drawing Sheets

(51) Int. Cl.
    *H01M 8/2425*     (2016.01)
    *H01M 8/2475*     (2016.01)
    *H01M 8/04014*     (2016.01)
    *H01M 8/04082*     (2016.01)
    *H01M 8/04701*     (2016.01)
    *H01M 8/2484*     (2016.01)

(56) References Cited

U.S. PATENT DOCUMENTS

| | | |
|---|---|---|
| 6,682,838 B2 | 1/2004 | Stevens |
| 6,924,053 B2 | 8/2005 | McElroy |
| 7,781,115 B2 | 8/2010 | Lundberg |
| 8,137,855 B2 | 3/2012 | Weingaertner |
| 8,288,041 B2 | 10/2012 | Perry |
| 8,535,839 B2 | 9/2013 | Perry |
| 8,962,210 B2 | 2/2015 | Zhiwen |
| 9,105,894 B2 | 8/2015 | Perry |
| 9,166,240 B2 | 10/2015 | Weingaertner |
| 2009/0208785 A1 | 8/2009 | McElroy |
| 2011/0053027 A1 | 3/2011 | Weingaertner |
| 2012/0034539 A1 | 2/2012 | George |
| 2018/0191007 A1* | 7/2018 | Perry .................. H01M 8/0618 |

FOREIGN PATENT DOCUMENTS

| | | |
|---|---|---|
| JP | 2012-198994 A | 9/2015 |
| JP | 2016-134379 A | 1/2019 |
| JP | 2016-062722 A | 4/2019 |
| WO | 03/107463 | 12/2003 |
| WO | 2010/044772 | 4/2010 |

OTHER PUBLICATIONS

McLarty et al., "Fuel Cell Gas Turbine Hybrid System Design Part I: Steady State Performance", National Fuel Cell Research Centre, University of California, pp. 412-420, Dec. 28, 2013.

Petrucha et al., "Knock Sensor and Passive Pressure Relief Components for Detecting and Correcting Fuel Cell System Operational Conditions", ip.com, https://priorart.ip.com/IPCOM/000245607, Mar. 21, 2016.

Extended European Search Report and Opinion issued in connection with corresponding EP Application No. 17189359.7 dated Nov. 30, 2017.

* cited by examiner

INTEGRATED FUEL CELL SYSTEMS

CROSS-REFERENCE TO RELATED APPLICATIONS

This application is a divisional of U.S. application Ser. No. 15/263,505, filed Sep. 13, 2016, the entire disclosure of which is hereby expressly incorporated herein by reference in its entirety.

FIELD

The subject matter described herein generally relates to fuel cell systems.

BACKGROUND

Fuel cells are electrochemical energy conversion devices that have demonstrated a potential for relatively high efficiency and low pollution in power generation. A fuel cell generally provides a direct current (dc) which may be converted to alternating current (ac) via, for example, an inverter. The dc or ac voltage can be used to power motors, lights, communication equipment and any number of electrical devices and systems. Fuel cells may operate in stationary, semi-stationary, or portable applications. Certain fuel cells, such as SOFCs, may operate in large-scale power systems that provide electricity to satisfy industrial and municipal needs. Others may be useful for smaller portable applications such as, for example, powering cars.

A fuel cell produces electricity by electrochemically combining a fuel and an oxidant across an ionic conducting layer. This ionic conducting layer, also labeled the electrolyte of the fuel cell, may be a liquid or solid. Common types of fuel cells include phosphoric acid (PAFC), molten carbonate (MCFC), proton exchange membrane (PEMFC), and solid oxide (SOFC), all generally named after their electrolytes. In practice, fuel cells are typically amassed in electrical series in an assembly of fuel cells to produce power at useful voltages or currents.

In general, components of a fuel cell include the electrolyte and two electrodes. The reactions that produce electricity generally take place at the electrodes where a catalyst is typically disposed to speed the reactions. The electrodes may be constructed as channels, porous layers, and the like, to increase the surface area for the chemical reactions to occur. The electrolyte carries electrically charged particles from one electrode to the other and is otherwise substantially impermeable to both fuel and oxidant.

Typically, the fuel cell converts hydrogen (fuel) and oxygen (oxidant) into water (byproduct) to produce electricity. The byproduct water may exit the fuel cell as steam in high-temperature operations. This discharged steam (and other hot exhaust components) may be utilized in turbines and other applications to generate additional electricity or power, providing increased efficiency of power generation. If air is employed as the oxidant, the nitrogen in the air is substantially inert and typically passes through the fuel cell. Hydrogen fuel may be provided via local reforming (e.g., on-site steam reforming) or remote reforming of carbon-based feedstocks, such as reforming of the more readily available natural gas and other hydrocarbon fuels and feedstocks. Examples of hydrocarbon fuels include, but are not limited to, natural gas, methane, ethane, propane, methanol, and other hydrocarbons.

Fuel cell systems include many components to transfer heat between streams of fuel, to transfer heat between streams of air, and to oxidized the discharged effluent from the fuel cells. These components typically are separate and spatially distributed apart from each other. A significant amount of conduits (e.g., in terms of the number of conduits and/or the total length of the conduits) may be needed to fluidly couple these components. As the amount of conduits needed increases, the amount of heat loss from the fuel and/or air flowing through the conduits increases. As a result, the conduits may need to be fabricated from more thermally insulative (and, therefore, more expensive) materials and/or additional heating components may need to be added to the system. This increases the cost and complexity of the fuel cell systems.

BRIEF DESCRIPTION

In one embodiment, an integrated fuel cell system includes one or more fuel cell stacks each including fuel cells configured to generate electric current based on fuel and air supplied to the fuel cells, one or more fuel heat exchangers configured to exchange heat between the fuel supplied to the fuel cells for generating the electric current and a first portion of fuel that is output from the fuel cells, one or more air heat exchangers configured to exchange heat between the air supplied to the fuel cells for generating the electric current and effluent that is output from the fuel cells, and one or more tail gas oxidizers configured to receive a second portion of the fuel that is output from the fuel cells and air that is output from the fuel cells. The one or more tail gas oxidizers are configured to oxidize the second portion of the fuel with the effluent that is output from the fuel cells. The one or more fuel cell stacks are fluidly coupled with the one or more fuel heat exchangers and the one or more tail gas oxidizers such that the fuel that is output from the fuel cells is split into the first portion that is directed back into the one or more fuel heat exchangers and the second portion that is directed into the one or more tail gas oxidizers.

In one embodiment, an integrated fuel cell system includes one or more fuel cell stacks each including fuel cells configured to generate electric current based on fuel and air supplied to the fuel cells, one or more fuel heat exchangers configured to exchange heat between the fuel supplied to the fuel cells for generating the electric current and a first portion of fuel that is output from the fuel cells, and one or more tail gas oxidizers configured to receive a second portion of the fuel that is output from the fuel cells and air that is output from the fuel cells. The one or more tail gas oxidizers are configured to oxidize the second portion of the fuel with effluent that is output from the fuel cells. The one or more fuel cell stacks can be fluidly coupled with the one or more fuel heat exchangers and the one or more tail gas oxidizers such that the fuel that is output from the fuel cells is split into the first portion that is directed back into the one or more fuel heat exchangers and the second portion that is directed into the one or more tail gas oxidizers.

In one embodiment, a method includes receiving mixed input source fuel into one or more fuel heat exchangers configured to exchange heat between the mixed input source fuel and a first portion of fuel that is output from fuel cells in one or more fuel cell stacks, generating electric current using the fuel cells in the one or more fuel cell stacks by consuming at least some fuel that is heated by the one or more fuel heat exchangers and at least some air that is heated by one or more air heat exchangers, and directing the first portion of the fuel that is output from the fuel cells into the one or more fuel heat exchangers and a second, remaining portion of the fuel that is output from the fuel cells into one or more tail gas oxidizers.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The inventive subject matter described herein provides fuel cell systems that are highly integrated relative to some known fuel cell systems. This integration is permissible due to changes in the paths that fuel and/or air flow within the fuel cell system, which allows for various components of the fuel cell system to be located closer together. This results in fewer and shorter conduits being needed to fluidly couple components of the fuel cell system. Consequently, less heat loss in the fuel and/or air flowing through the fuel cell system occurs, and the cost and complexity of the fuel cell system is decreased (relative to some other fuel cell systems).

Figure 1:
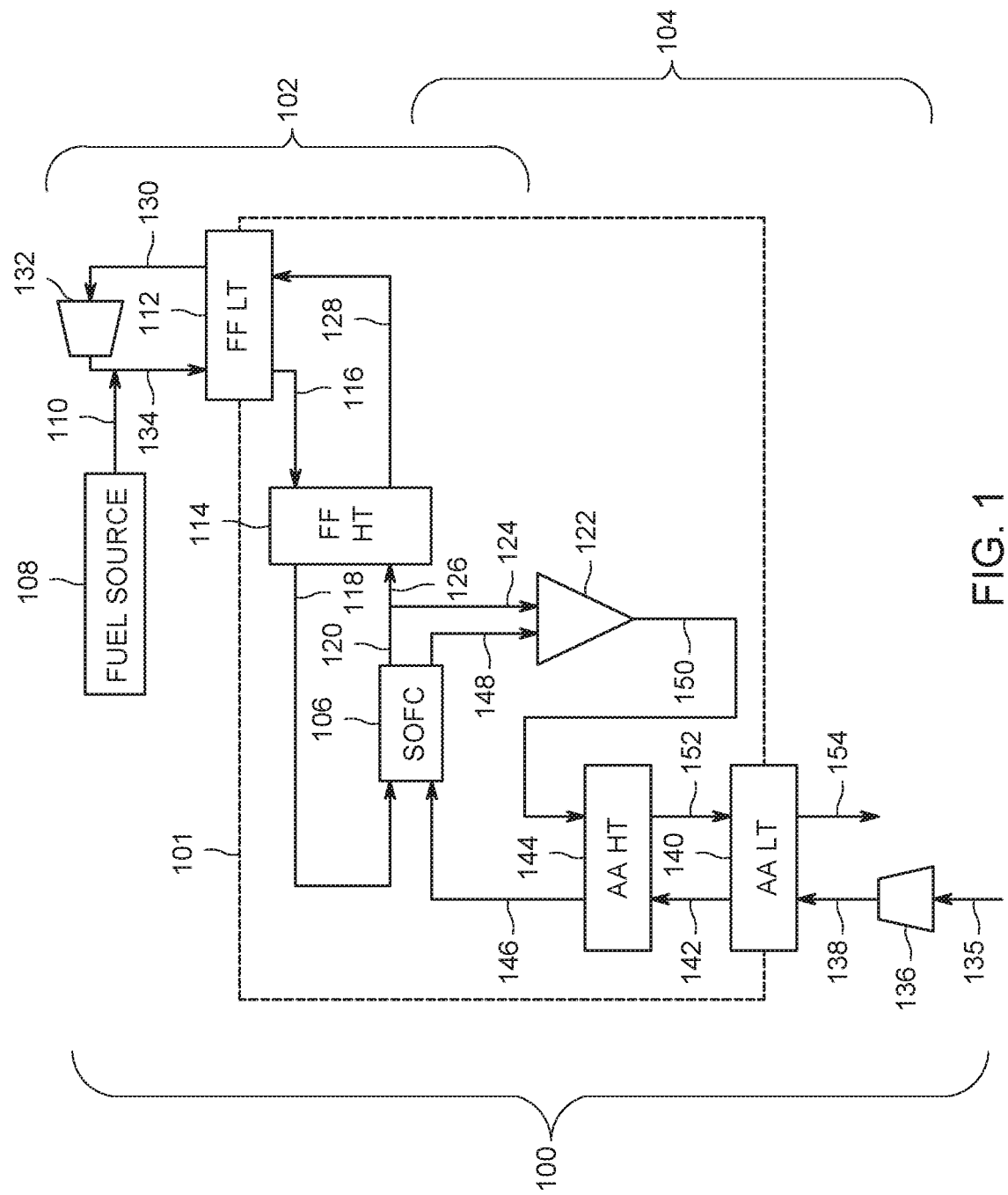
FIG. 1 illustrates a flow diagram of one embodiment of an integrated fuel cell system.

FIG. 1 illustrates a flow diagram of one embodiment of a fuel cell system 100. Operation and components of the fuel cell system are described in connection with how fuel and air flow through the fuel cell system 100. Fuel flows in the fuel cell system 100 along or in a fuel flow cycle 102 and air flows in the fuel cell system along or in an airflow cycle 104. The flow cycles 102, 104 represent directions and paths in which fuel and air respectively flow through the various components of the fuel cell system 100 in order to be heated, exchange heat, and be provided to one or more stacks of fuel cells 106 in order to generate electric current. The fuel cells 106 can represent one or more stacks of fuel cells, such as SOFC or another type of fuel cell.

With respect to the fuel cell cycle 102, fuel is input into the fuel cell system 100 from a source 108 of the fuel ("Fuel Source" in FIG. 1). This source 108 can represent one or more containers of a hydrogen-containing substance, such as natural gas. The fuel provided by the source 108 and input into the fuel cell system 100 may be referred to as source input fuel 110. The input fuel 110 is mixed with output fuel 130 exiting from a fuel blower 132 to form mixed input fuel 134, as described in more detail below.

The mixed input fuel 134 is received into a low temperature fuel heat exchanger 112 ("FF LT" in FIG. 1). In the low temperature fuel heat exchanger 112, the mixed input fuel 134 is heated. The mixed input fuel 134 receives heat from the output fuel 130 in the low temperature fuel heat exchanger 112, which is fuel output by a high temperature heat exchanger 114 ("FF HT" in FIG. 1). In one embodiment, the temperature of the mixed input fuel 134 may be increased by the low temperature fuel heat exchanger 112 such that the temperature of the mixed input fuel 134 is at least doubled. For example, the temperature of the mixed input fuel 134 may be increased from a temperature of around 190° C. to temperature in excess of 500° C., such as 520° C. The mixed input fuel 134 is heated and output from the low temperature fuel heat exchanger 112 as heated input fuel 116.

This heated input fuel 116 is then received into the high temperature fuel heat exchanger 114. The high temperature fuel heat exchanger 114 increases the temperature of the heated input fuel 116 from thermal energy in heating fuel 126 that is received by the high temperature fuel heat exchanger 114 from the fuel cell stacks 106 (described in more detail below). Similar to the low temperature fuel heat exchanger 112, the high temperature fuel heat exchanger 114 transfers heat (e.g., thermal energy) from the hotter heating fuel 126 to the cooler heated input fuel 116. The temperature of the heated input fuel 116 is increased in the high temperature fuel heat exchanger 114 and output as increased temperature fuel 118.

In one embodiment, the increase in temperature of the heated input fuel 116 to the increased temperature fuel 118 is less than the increase in temperature from the mixed input fuel 134 to the heated input fuel 116. For example, the low temperature fuel heat exchanger 112 may more than double the temperature of the mixed input fuel 134 while the high temperature fuel heat exchanger 114 increases the temperature of the heated input fuel 116 by a lesser amount. The high temperature fuel heat exchanger 114 can increase the heated input fuel 116 from a temperature of about 520° C. to a temperature of the increased temperature fuel 118 that is at least 700° C., such as 702° C.

The increased temperature fuel 118 that is output from the high temperature fuel heat exchanger 114 is directed to the one or more fuel cell stacks 106. The fuel cells in the stacks 106 consume at least part of this increased temperature fuel 118 in the generation of electric current. The fuel that is not consumed by the fuel cell stacks 106 is output from the fuel cell stacks 106 as output fuel 120. The output fuel 120 may have an increased temperature relative to the increased temperature fuel 118 is input into the fuel cell stacks 106. For example, the temperature of the output fuel 120 may be in excess of 800° C., such as 808° C., while the temperature of the increased temperature fuel 118 may be 700° C. or another temperature.

In one embodiment of the inventive subject matter described herein, part of the output fuel 120 from the fuel cell stacks 106 is split off from the fuel cycle 102 as split off fuel 124. For example, the conduit carrying the output fuel 120 from the fuel cell stacks 106 may split into two or more separate conduits, with one or more conduits carrying the split off fuel 124 into the air flow cycle 104 and one or more other conduits carrying the remaining output fuel 120 to the high temperature fuel heat exchanger 114 as the heating fuel 126. In one embodiment, the portion of the output fuel 120 split off or separated from the fuel cycle 102 as the split off fuel 124 can be 20% of the output fuel 120. For example, 20% of the mass of the output fuel 120 may be directed into the air flow cycle 104 as the split off fuel 124.

The heating fuel 126 is input into the high temperature fuel heat exchanger 114. This heating fuel 126 exchanges heat with the input fuel 116 in the heat exchanger 114. Heat is transferred from the heating fuel 126 to the input fuel 116 in order to increase the temperature of the input fuel 116 to the temperature of the increased temperature fuel 118 that is output by the high temperature fuel heat exchanger 114. The heating fuel 126 is cooled by the high temperature fuel heat exchanger 114 and is output from the high temperature fuel heat exchanger 114 as reduced temperature fuel 128. In one embodiment, the temperature of the heating fuel 126 may be reduced by the high temperature fuel heat exchanger 114 by at least 200° C. For example, the temperature of the heating fuel 126 may be in excess of 800° C. (for example, a temperature of 802° C.) while the temperature of the reduced temperature fuel 128 may be below 680° C.

The reduced temperature fuel 128 is output from the high temperature fuel heat exchanger 114 and is input into the low temperature fuel heat exchanger 112, as shown in FIG. 1. The low temperature fuel heat exchanger 112 exchanges thermal energy from the reduced temperature fuel 128 to the mixed input fuel 134. This cools the reduced temperature fuel 128 and heats up the mixed input fuel 134. For example, the temperature of the reduced temperature fuel 128 may be reduced (for example, to 200° C.) by transferring thermal energy to the mixed input fuel 134. This increases the temperature of the mixed input fuel 134 to the temperature of the input fuel 116.

The reduced temperature fuel 128 is cooled and output from the low temperature fuel heat exchanger 112 as the output fuel 130. The output fuel 130 is recirculated into the fuel flow cycle 102 by the blower 132, which can represent a fan or other device that moves the fuel through the fuel flow cycle 102. The output fuel 130 passes through the blower 132 to keep the fuel moving within the fuel flow cycle 102. The blower 132 may increase the temperature of the output fuel 130, such as by increasing temperature of the output fuel 130 from 200° C. to 230° C., as one example. As described above, the output fuel 130 is missed with the source input fuel 110 to form the mixed input fuel 134 in the fuel flow cycle 102.

In one embodiment, all of the output fuel 130 that is received into the fuel blower 132 is directed into the low temperature fuel heat exchanger 112. This output fuel 130 can be mixed with additional source input fuel 110, but no part of the output fuel 130 received into the fuel blower 132 from the low temperature fuel heat exchanger 112 is split off or directed elsewhere other than back into the low temperature fuel heat exchanger 112.

With respect to the air flow cycle 104 of the fuel cell system 100, source air 135 is drawn into the fuel cell system 100 by a blower 136. This air 135 may be obtained from an oxygen tank or may be ambient air drawn into the fuel cell system 100 from outside of the fuel cell system 100. The air 135 output by the blower 136 can be referred to as input air 138.

The input air 138 is directed into a low temperature air heat exchanger 140 ("AA LT" in FIG. 1). Similar to as described above with the low temperature fuel heat exchanger 112, the low temperature air heat exchanger 140 increases the temperature of the input air 138 and outputs the air as heated air 140. In one embodiment, the temperature of the input air 138 is or is about 90° C., and the temperature of the heated air 140 is at least 500° C., such as 520° C. The heated air 142 is input into a high temperature air heat exchanger 144 ("AA HT" in FIG. 1) and is heated from heat of oxidized effluent 150 (described below). For example, the high temperature air heat exchanger 144 can increase the temperature of the heated air 142 at least 100° C. and up to 200° C. (or another temperature). In one embodiment, the high temperature air heat exchanger 144 increases the temperature of the air 142 from 520° C. to a temperature of about 700° C. The high temperature air heat exchanger 144 heats the air 142 into input air 146 that is output by the heat exchanger 144.

The input air 146 is directed into the fuel cell stacks 106 for at least partial consumption by the fuel cells. As described above, the fuel cells 106 consume at least some of the fuel 118 and air 146 to generate electric current. In one embodiment, fuel cell may generate significant amounts of electric current, such as 270 kW of electric energy. In addition to the output fuel 120 that is output from the fuel cell stacks 106, the fuel cell stacks 106 also direct output air 148 out of the fuel cell stacks 106. The output air 148 is directed into the tail gas oxidizer 122 along with the split off fuel 124, as described above. The output air 148 may be effluent that is output by the fuel cells. As shown in FIG. 1, all of the air that is output by the fuel cells may be directed into the tail gas oxidizer 122.

The tail gas oxidizer 122 oxidizes the split off fuel 124 using at least some of the output air 148. The oxidized fuel is output from the tail gas oxidizer 122 as the oxidized effluent 150. The oxidized effluent 150 may have an elevated temperature, such as the temperature of 850° C. or another temperature. The oxidized effluent 150 is received into the high temperature air heat exchanger 144, where the effluent 150 heats the heated air 142 into the input air 146, as described above. In one embodiment, passage of the oxidized effluent 150 through the high temperature air heat exchanger 144 reduces the temperature of the effluent 150 by at least 200° C. For example, the temperature of the oxidized effluent 150 may be reduced from a temperature of 850° C. to a temperature such as 630° C., or 632° C.

The effluent 150 exits the high temperature heat exchanger 144 as output effluent 152. The low temperature air heat exchanger 140 receives the output effluent 152 and transfers thermal energy from the output effluent 152 to the input air 138, as described above. This can reduce the temperature of the output effluent 152 from a temperature in excess of 600° C. to a temperature of no more than 250° C. The output effluent 152 exits the low temperature air heat exchanger as output air 154, which exits the air flow cycle 104 (as shown in FIG. 1).

One difference between the fuel and air flow cycles 102, 104 in the fuel cell system 100 and other fuel cell systems is the location of where fuel is split off from the fuel flow cycle into the tail gas oxidizer. Some known fuel cell systems split off the fuel from the fuel flow cycle in a location that would be between the fuel blower 132 and the low temperature fuel heat exchanger 112. Because the fuel blower 132 and the low temperature fuel heat exchanger 112 may not be located close to the tail gas oxidizer 122 in these systems, splitting off the fuel in this location can require a significant amount (e.g., length) of conduits. This can increase the cost and complexity of the system.

In the illustrated embodiment of the fuel cell system 100, however, the fuel splits off from the fuel flow cycle 102 in a location between the fuel cell stacks 106 and the tail gas oxidizer 122 (e.g., downstream of the fuel cell stacks 106 and upstream of the tail gas oxidizer 122 in the direction of fuel flow in the fuel flow cycle 102). The fuel 124 may split off from the fuel flow cycle 102 in this location, without any other components (e.g., any other heat exchangers, blowers, etc.) being located between the fuel cell stacks 106 and the oxidizer 122. For example, because the fuel cell stacks 106 are directly coupled with the oxidizer 122 without any heat exchangers, blowers, etc., located between the fuel cell stacks 106 and the oxidizer 122, the fuel can be split off in this location without passing through any other components prior to the split off.

Another difference between some known fuel cell systems is that the fuel cell system 100 directs the output air 148 from the fuel cell stacks 106 directly into the oxidizer 122 for oxidizing the split off fuel 124. The oxidizer 122 can be close to the fuel cell stacks 106 to allow for this flow path of the output air 148 and to avoid a requirement for a significant distance of conduits to direct the output air 148 into the oxidizer 122. Additionally, the oxidized effluent 150 from the oxidizer 122 can be directed directly into the high temperature air heat exchanger 144 without the oxidized effluent 150 passing through any other components or mixing with any other fluids (e.g., without mixing with the air 148 that is output from the fuel cell stacks 106.

Figure 2:
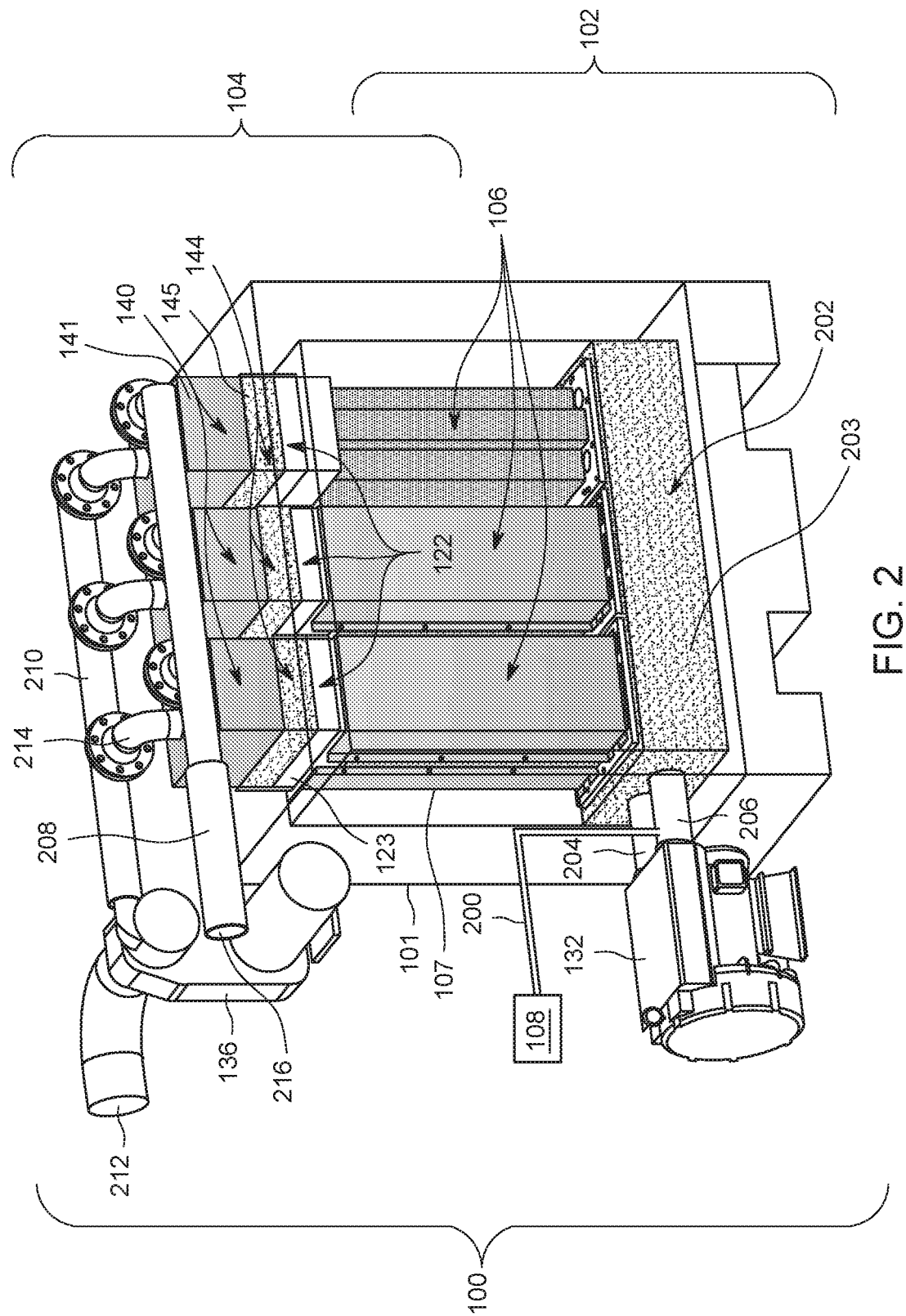
FIG. 2 illustrates a perspective view of the fuel cell system shown in FIG. 1.

FIG. 2 illustrates a perspective view of the fuel cell system 100 shown in FIG. 1. The fuel source 108 can represent one or more tanks or other containers fuel through the fuel cells in the fuel cell stacks 106. For example, the source 108 can represent one or more tanks of natural gas or other hydrogen-containing substances. The resource 108 is fluidly coupled with a fuel input conduit 206 by a fuel supply conduit 200.

The fuel blower 132 is fluidly coupled with the fuel input conduit 206 and a fuel output conduit 204. The fuel supply conduit 200 carries or directs the source input fuel 110 (shown in FIG. 1) from the fuel source 108 to the fuel input conduit 206, the fuel input conduit 206 carries the mixed input fuel 134 (shown in FIG. 1) from the fuel blower 132 to a fuel heat exchanger assembly 202, and the fuel output conduit 204 carries or directs the output fuel 130 from the fuel heat exchanger assembly 202 to the fuel blower 132.

The heat exchanger assembly 202 represents a combination of the low temperature fuel heat exchanger 112 and the high temperature fuel heat exchanger 114 shown in FIG. 1. The heat exchangers 112, 114 are fluidly coupled with each other and with the conduits 204, 206 such that the low temperature fuel heat exchanger 112 receives the mixed input fuel 134 from the conduit 206, the high temperature fuel heat exchanger 114 receives the heated input fuel 116 from the low temperature heat exchanger 114, the low temperature fuel heat exchanger 112 receives the reduced temperature fuel 128 from the high temperature fuel heat exchanger 114, and the low temperature fuel heat exchanger 112 directs the output fuel 130 into the fuel blower 132 via the conduit 204. Although the conduits that fluidly couple the fuel heat exchangers are not visible in FIG. 2, these conduits may resemble the conduits 204, 206 shown in FIG. 2, but disposed within an outer housing 203 of the fuel exchanger assembly 202 (e.g., the portion of the assembly 202 that is visible in FIG. 2).

The fuel heat exchanger assembly 202 is coupled with housings 107 that contain the fuel cell stacks 106. The housings that contain the fuel cell stacks 106 may sit directly on top of the heat exchanger assembly 202, as shown in FIG. 2. For example, at least part of the outer, external surface of the housings in which the fuel cell stacks 106 are disposed may directly contact or abut at least part of the outer, external surface of the housing of the fuel heat exchanger assembly 202. This allows the amount of conduit needed to the couple the fuel source 108, the blower 132, the heat exchangers 112, 114, and the fuel cell stacks 106 to be reduced relative to another fuel cell system having one or more of these components disposed farther away from the other components.

The increased temperature fuel 118 is directed out of the fuel heat exchanger assembly 202 and into the fuel cell stacks 106. The increased temperature fuel 118 is at least partially consumed by the fuel cells in the stacks 106 to generate electric current. A portion of the fuel 118 that is not consumed by the fuel cells is directed into the tail gas oxidizer 122 as the split off fuel 124, and the remainder of the fuel 118 that is not consumed by the fuel cells is directed back into the high temperature fuel heat exchanger 114 in the heat exchanger assembly 202.

For example, although not visible in FIG. 2, each of the fuel cell stacks 106 may include several conduits, with one or more conduits directing some of the fuel leaving the fuel cell stacks 106 into the tail gas oxidizers 122 as the split off fuel 124 and one or more other conduits directing a remainder of the fuel leaving the fuel cell stacks 106 back into the heat exchanger assembly 202, specifically into the high temperature fuel heat exchanger 114, as described above.

The tail gas oxidizer 122 shown in FIG. 1 may represent multiple, separate tail gas oxidizers 122, as shown in FIG. 2. Each oxidizer 122 may sit directly on top of a different fuel cell stack 106, and may separately oxidize the split off fuel 124 coming from that fuel cell stack 106. For example, at least part of the outer, external surface of housings 123 in which the tail gas oxidizers 122 are disposed may directly contact or abut at least part of the outer, external surfaces of the housings of the fuel cell stacks 106. The locations of the oxidizers 122 on top of the stacks 106 also can reduce the amount and distance of conduit needed to fluidly couple the stacks 106 with the oxidizers 122. Optionally, two or more stacks 106 may be coupled with the same oxidizer 122 instead of each fuel cell stack 106 having a separate oxidizer 122.

The high temperature air heat exchanger 144 shown in FIG. 1 may represent multiple, separate high temperature air heat exchangers 144, as shown in FIG. 2. Each separate high temperature air heat exchanger 144 may sit directly on top of a different tail gas oxidizer 122, and may receive the oxidized effluent 150 coming out of the respective tail gas oxidizer 122. For example, at least part of the outer, external surface of housings 145 in which the high temperature air heat exchangers 144 are disposed may directly contact or abut at least part of the outer, external surfaces of the housings of the tail gas oxidizers 122. The locations of the high temperature air heat exchangers 144 on top of the tail gas oxidizers 122 can reduce the amount and distance of conduit needed to fluidly couple the heat exchangers 144 with the oxidizers 122. Optionally, two or more oxidizers 122 may be coupled with the same heat exchanger 144 and/or two or more heat exchangers 144 may be coupled with the same oxidizer 122.

The high temperature air heat exchangers 144 also are fluidly coupled with the fuel cell stacks 106 in order to supply the input air 146 into the fuel cell stacks 106. In one embodiment, each of the high temperature air heat exchangers 144 includes one or more conduits fluidly coupled with the respective tail gas oxidizer 122 to receive the oxidized effluent 150 and one or more other, separate conduits fluidly coupled with the respective fuel cell stacks 106 to deliver the input air 146 into the fuel cell stack 106.

The low temperature air heat exchanger 140 shown in FIG. 1 may represent multiple, separate low temperature air heat exchangers 140, as shown in FIG. 2. Each separate low temperature air heat exchanger 140 may sit directly on top of a different high temperature air heat exchanger 144, and may receive the output effluent 152 coming out of the respective high temperature air heat exchanger 144. For example, at least part of the outer, external surface of housings 141 in which the low temperature air heat exchangers 140 are disposed may directly contact or abut at least part of the outer, external surfaces of the housings of the high temperature air heat exchangers 144.

The locations of the low temperature air heat exchangers 140 on top of the high temperature air heat exchangers 144 can reduce the amount and distance of conduit needed to fluidly couple the heat exchangers 140, 144 with each other. Optionally, two or more low temperature air heat exchangers 144 may be coupled with the same high temperature air heat exchanger 140 and/or two or more high temperature air heat exchangers 140 may be coupled with the same low temperature air heat exchanger 144.

In one embodiment, the low and high temperature air heat exchangers 140, 144 are disposed within a single housing as an air heat exchanger assembly, similar to as described above in connection with the fuel heat exchanger assembly 202. Combining the low and high temperature air heat exchangers into a single unit within a single housing and/or combining the low and high temperature fuel heat exchangers into a single unit within a single housing can provide for a simpler, lower cost system. But, keeping the low and high temperature air heat exchangers separate (e.g., in separate housings) and/or keeping the low and high temperature fuel heat exchangers separate (e.g., in separate housings) can allow for the low temperature heat exchangers to be formed from less expensive materials (relative to the high temperature heat exchangers) and can allow for thermal stresses caused by the different amounts of thermal expansion in the heat exchangers to be controlled (e.g., based on the geometric designs of the housings).

The low temperature air heat exchangers 140 are fluidly coupled with an input manifold 210 and an output manifold 208 by several separate conduits 214. The input manifold 210 is fluidly coupled with an air inlet 212, through which the source air 135 is received into the system 100. The source air 135 may be obtained from one or more tanks, reservoirs, or the ambient surroundings of the system 100. The air blower 136 is fluidly coupled with the input manifold 210 to draw and/or push the source air 135 through the input manifold 210 and through the conduits 214 into the low temperature air heat exchangers 140. The output manifold 208 includes an outlet 216 through which the output air 154 exits the system 100. For example, the output air 154 is directed into the output manifold 208 from the low temperature air heat exchangers 140 via the conduits 214, and exits the system 100 through the outlet 216.

The positions of the heat exchangers and fuel cell stacks may differ from those shown in FIG. 2. For example, the fuel heat exchanger assembly 202 may be disposed on top of the fuel cell stacks 106 and the tail gas oxidizers 122 and air heat exchangers 140, 144 may be below the fuel cell stacks 106. As another example, the fuel cell stacks 106 may be oriented in another direction (e.g., horizontally as opposed to the vertical orientation shown in FIG. 2) with the fuel heat exchanger assembly 202 on one side (e.g., the left side or right side) of the fuel cell stacks 106 and the tail gas oxidizers 122 and air heat exchangers 140, 144 on the opposite side (e.g., the right side or left side) of the fuel cell stacks 106.

Figure 3:
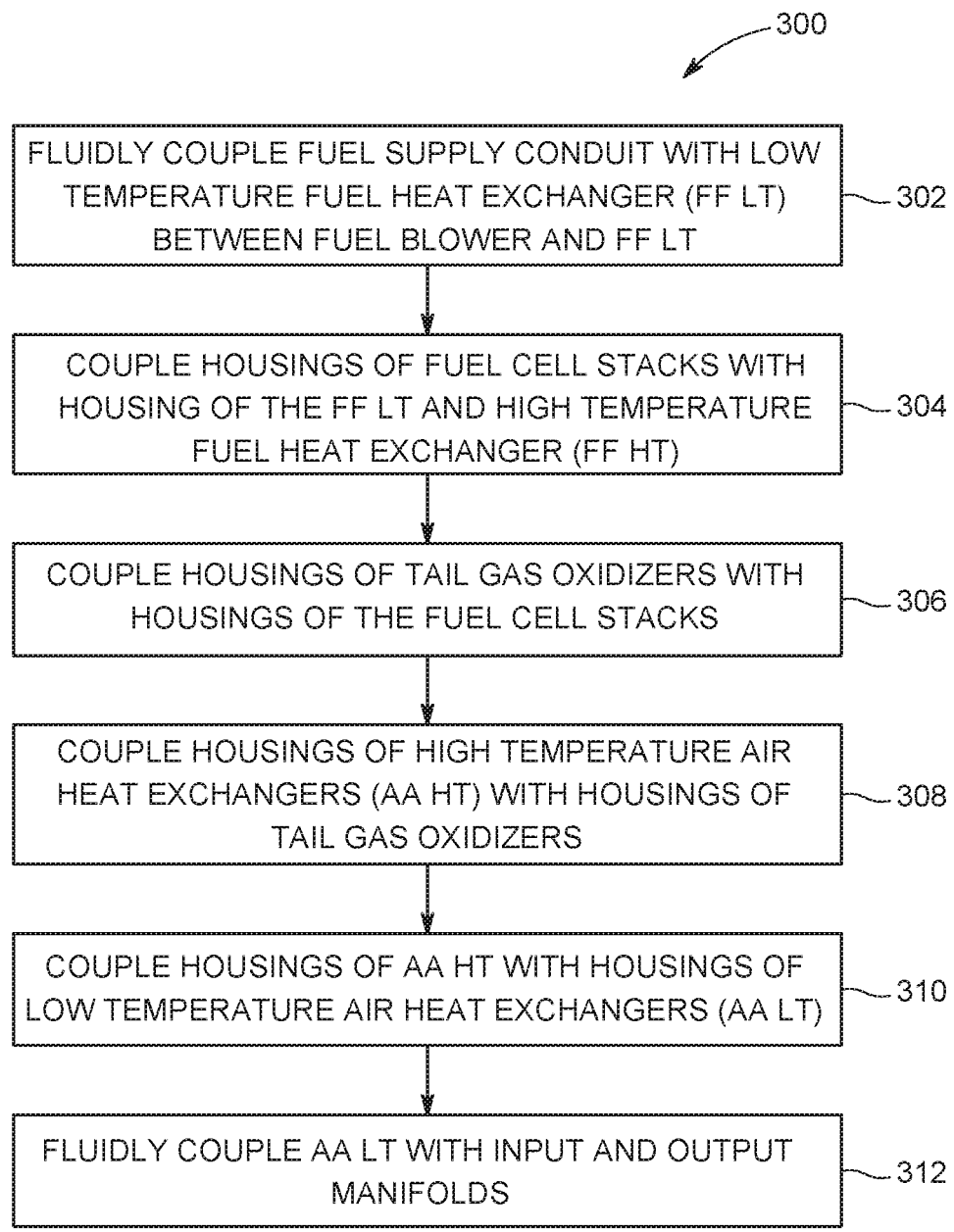
FIG. 3 illustrates a flowchart of one embodiment of a method for providing an integrated fuel cell system.

FIG. 3 illustrates a flowchart of one embodiment of a method 300 for providing an integrated fuel cell system. The method 300 may be used to manufacture or create the fuel cell system 100 shown in FIGS. 1 and 2 in one embodiment. At 302, a fuel supply conduit is fluidly coupled with a low temperature fuel heat exchanger. The fuel supply conduit may be connected with the low temperature fuel heat exchanger in a location that is between the fuel blower and the low temperature fuel heat exchanger, as described above.

At 304, the housings of the fuel cell stacks are coupled with the housing of the low temperature fuel heat exchanger and a high temperature fuel heat exchanger. The fuel cell stacks may be placed directly on top of the heat exchangers. The fuel cell stacks may include multiple conduits connected with the high temperature fuel heat exchanger. Some of these conduits can be input conduits that direct the increased temperature fuel from the high temperature fuel heat exchanger for partial consumption of the fuel cells to generate electric current. Others of these conduits can be return conduits that direct the heating fuel back into the high temperature fuel heat exchanger, as described above.

At 306, housings of tail gas oxidizers are coupled with the housings of the fuel cell stacks. Conduits inside these housings may fluidly couple the oxidizers with the stacks in order to direct the split off fuel from the stacks into the tail gas oxidizers and to direct the output air from the stacks into the tail gas oxidizers.

At 308, housings of high temperature air heat exchangers are coupled with the housings of the tail gas oxidizers. Conduits inside these housings can fluidly couple the tail gas oxidizers with the high temperature air heat exchangers in order to direct the oxidized effluent from the oxidizers into the high temperature air heat exchangers, as described above.

At 310, housings of the high temperature air heat exchangers are coupled with the housings of the high temperature air heat exchangers. Conduits in these housings can exchange the output effluent from the high temperature air heat exchangers and the heated air from the low temperature air heat exchangers.

At 312, the low temperature air heat exchangers are fluidly coupled with input and output manifolds. As described above, conduits can fluidly couple these manifolds with the low temperature air heat exchangers in order to direct the source air into the low temperature air heat exchangers and to direct the output air from the low temperature air heat exchangers out of the fuel cell system.

In one embodiment, an integrated fuel cell system includes one or more fuel cell stacks each including fuel cells configured to generate electric current based on fuel and air supplied to the fuel cells, one or more fuel heat exchangers configured to exchange heat between the fuel supplied to the fuel cells for generating the electric current and a first portion of fuel that is output from the fuel cells, one or more air heat exchangers configured to exchange heat between the air supplied to the fuel cells for generating the electric current and effluent that is output from the fuel cells, and one or more tail gas oxidizers configured to receive a second portion of the fuel that is output from the fuel cells and air that is output from the fuel cells. The one or more tail gas oxidizers are configured to oxidize the second portion of the fuel with the effluent that is output from the fuel cells. The one or more fuel cell stacks are fluidly coupled with the one or more fuel heat exchangers and the one or more tail gas oxidizers such that the fuel that is output from the fuel cells is split into the first portion that is directed back into the one or more fuel heat exchangers and the second portion that is directed into the one or more tail gas oxidizers.

In one example, the one or more fuel heat exchangers can be configured to be fluidly coupled with a fuel blower in order to direct all fuel that is output from the one or more heat exchangers back into the one or more fuel heat exchangers via the fuel blower.

In one example, the one or more fuel heat exchangers can be configured to be fluidly coupled with a fuel source in a location between the fuel blower and the one or more heat exchangers.

In one example, an external housing of the one or more fuel cell stacks can abut an external housing of the one or more fuel heat exchangers.

In one example, an external housing of the one or more tail gas oxidizers can abut an external housing of the one or more fuel cell stacks.

In one example, an external housing of the one or more air heat exchangers can abut an external housing of the one or more tail gas oxidizers.

In one example, the one or more fuel cell stacks can be disposed between and directly coupled with the one or more fuel heat exchangers and the one or more tail gas oxidizers.

In one example, the one or more tail gas oxidizers can be disposed between and directly coupled with the one or more fuel cell stacks and the one or more air heat exchangers.

In one example, the one or more fuel heat exchangers can include a low temperature fuel heat exchanger and a high temperature fuel heat exchanger. The low temperature fuel heat exchanger can be disposed between a fuel blower and a fuel source along a fuel flow cycle. The high temperature fuel heat exchanger can be disposed between the low temperature fuel heat exchanger and the one or more fuel cell stacks along the fuel flow cycle.

In one example, the one or more fuel heat exchangers can be coupled to one end of the one or more fuel cell stacks and the one or more tail gas oxidizers and the one or more air heat exchangers can be coupled to an opposite end of the one or more fuel cell stacks.

In one embodiment, an integrated fuel cell system includes one or more fuel cell stacks each including fuel cells configured to generate electric current based on fuel and air supplied to the fuel cells, one or more fuel heat exchangers configured to exchange heat between the fuel supplied to the fuel cells for generating the electric current and a first portion of fuel that is output from the fuel cells, and one or more tail gas oxidizers configured to receive a second portion of the fuel that is output from the fuel cells and air that is output from the fuel cells. The one or more tail gas oxidizers are configured to oxidize the second portion of the fuel with effluent that is output from the fuel cells. The one or more fuel cell stacks can be fluidly coupled with the one or more fuel heat exchangers and the one or more tail gas oxidizers such that the fuel that is output from the fuel cells is split into the first portion that is directed back into the one or more fuel heat exchangers and the second portion that is directed into the one or more tail gas oxidizers.

In one example, the system also can include one or more air heat exchangers configured to exchange heat between the air supplied to the fuel cells for generating the electric current and the effluent that is output from the fuel cells.

In one example, the one or more fuel heat exchangers can be configured to be fluidly coupled with a fuel blower in order to direct all fuel that is output from the one or more heat exchangers back into the one or more fuel heat exchangers via the fuel blower.

In one example, the one or more fuel heat exchangers can be configured to be fluidly coupled with a fuel source in a location between the fuel blower and the one or more heat exchangers.

In one example, an external housing of the one or more fuel cell stacks can abut an external housing of the one or more fuel heat exchangers.

In one example, an external housing of the one or more tail gas oxidizers can abut an external housing of the one or more fuel cell stacks.

In one example, the one or more fuel cell stacks can be disposed between and directly coupled with the one or more fuel heat exchangers and the one or more tail gas oxidizers.

In one example, the one or more fuel heat exchangers can include a low temperature fuel heat exchanger and a high temperature fuel heat exchanger. The low temperature fuel heat exchanger can be disposed between a fuel blower and a fuel source along a fuel flow cycle. The high temperature fuel heat exchanger can be disposed between the low temperature fuel heat exchanger and the one or more fuel cell stacks along the fuel flow cycle.

In one embodiment, a method includes receiving mixed input source fuel into one or more fuel heat exchangers configured to exchange heat between the mixed input source fuel and a first portion of fuel that is output from fuel cells in one or more fuel cell stacks, generating electric current using the fuel cells in the one or more fuel cell stacks by consuming at least some fuel that is heated by the one or more fuel heat exchangers and at least some air that is heated by one or more air heat exchangers, and directing the first portion of the fuel that is output from the fuel cells into the one or more fuel heat exchangers and a second, remaining portion of the fuel that is output from the fuel cells into one or more tail gas oxidizers.

In one example, the second portion of the fuel that is output from the fuel cells can be split off from the first portion of the fuel and directed into the one or more tail gas oxidizers in a location between the fuel cells and the one or more fuel heat exchangers.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method of integrating a fuel cell system comprising:
receiving mixed input source fuel into one or more fuel heat exchangers configured to exchange heat between the mixed input source fuel and a first portion of fuel that is output from fuel cells in one or more fuel cell stacks;
generating electric current using the fuel cells in the one or more fuel cell stacks by consuming at least some fuel that is heated by the one or more fuel heat exchangers and at least some air that is heated by one or more air heat exchangers; and
directing the first portion of the fuel that is output from the fuel cells into the one or more fuel heat exchangers and a second, remaining portion of the fuel that is output from the fuel cells into one or more tail gas oxidizers, then splitting off the second portion of the fuel from the first portion of the fuel between the one or more fuel cell stacks and the one or more tail gas oxidizers, wherein the second portion of the fuel does not pass through any additional components prior to splitting off,
wherein the additional components may be selected from a group consisting of a heat exchanger and a blower.

2. The method of claim 1, wherein the method further comprises oxidizing the second portion of the fuel with an output air to form an oxidized effluent in the one or more tail gas oxidizers, wherein the oxidized effluent does not pass through any of the additional components or mix with any additional fluids prior to reaching the one or more air heat exchangers.

3. The method of claim 1, wherein the one or more fuel heat exchangers are configured to be fluidly coupled with a fuel blower in order to direct all fuel that is output from the one or more heat exchangers back into the one or more fuel heat exchangers via the fuel blower.

4. The method of claim 1, wherein the one or more fuel heat exchangers are configured to be fluidly coupled with a fuel source in a location between the fuel blower and the one or more heat exchangers.

5. The method of claim 1, wherein the one or more fuel cell stacks are disposed between and directly coupled with the one or more fuel heat exchangers and the one or more tail gas oxidizers.

6. The method of claim 1, wherein the one or more tail gas oxidizers are disposed between and directly coupled with the one or more fuel cell stacks and the one or more air heat exchangers.

7. The method of claim 1, wherein the one or more fuel heat exchangers include a low temperature fuel heat exchanger and a high temperature fuel heat exchanger, the low temperature fuel heat exchanger disposed between a fuel blower and a fuel source along a fuel flow cycle, the high temperature fuel heat exchanger disposed between the low temperature fuel heat exchanger and the one or more fuel cell stacks along the fuel flow cycle.

8. The method of claim 1, wherein one or more fuel heat exchangers are coupled to one end of the one or more fuel cell stacks and the one or more tail gas oxidizers and the one or more air heat exchangers are coupled to an opposite end of the one or more fuel cell stacks.

9. A method comprising:
receiving mixed input source fuel into one or more fuel heat exchangers configured to exchange heat between the mixed input source fuel and a first portion of fuel that is output from fuel cells in one or more fuel cell stacks;
generating electric current using the fuel cells in the one or more fuel cell stacks by consuming at least some fuel that is heated by the one or more fuel heat exchangers and at least some air that is heated by one or more air heat exchangers; and
directing the first portion of the fuel that is output from the fuel cells into the one or more fuel heat exchangers and a second, remaining portion of the fuel that is output from the fuel cells into one or more tail gas oxidizers,
wherein at least one of an external housing of the one or more fuel cell stacks abuts an external housing of the one or more fuel heat exchangers; an external housing of the one or more tail gas oxidizers abuts an external housing of the one or more fuel cell stacks; or an external housing of the one or more air heat exchangers abuts an external housing of the one or more tail gas oxidizers.

10. The method of claim 9, wherein the second portion of the fuel that is output from the fuel cells is split off from the first portion of the fuel and directed into the one or more tail gas oxidizers in a location between the fuel cells and the one or more fuel heat exchangers.

11. The method of claim 9, wherein the one or more fuel heat exchangers are configured to be fluidly coupled with a fuel blower in order to direct all fuel that is output from the one or more heat exchangers back into the one or more fuel heat exchangers via the fuel blower.

12. The method of claim 9, wherein the one or more fuel heat exchangers are configured to be fluidly coupled with a fuel source in a location between the fuel blower and the one or more heat exchangers.

13. The method of claim 9, wherein the one or more fuel cell stacks are disposed between and directly coupled with the one or more fuel heat exchangers and the one or more tail gas oxidizers.

14. The method of claim 9, wherein the one or more tail gas oxidizers are disposed between and directly coupled with the one or more fuel cell stacks and the one or more air heat exchangers.

15. The method of claim 9, wherein the one or more fuel heat exchangers include a low temperature fuel heat exchanger and a high temperature fuel heat exchanger, the low temperature fuel heat exchanger disposed between a fuel blower and a fuel source along a fuel flow cycle, the high temperature fuel heat exchanger disposed between the low temperature fuel heat exchanger and the one or more fuel cell stacks along the fuel flow cycle.

16. The method of claim 9, wherein one or more fuel heat exchangers are coupled to one end of the one or more fuel cell stacks and the one or more tail gas oxidizers and the one or more air heat exchangers are coupled to an opposite end of the one or more fuel cell stacks.

* * * * *